Sept. 28, 1943. J. D. RYAN ET AL 2,330,313
LAMINATED SAFETY GLASS
Filed Aug. 7, 1940
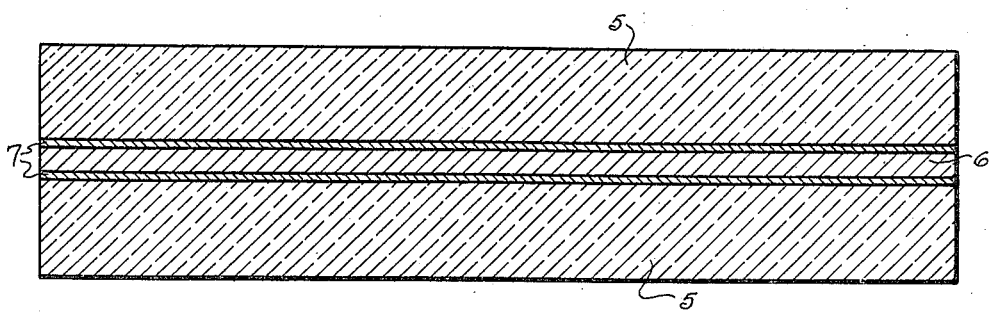
Inventors
JOSEPH D. RYAN,
GEORGE B. WATKINS.
By Frank Fraser
Attorney Patented Sept. 28, 1943

2,330,313

UNITED STATES PATENT OFFICE 2,330,313

LAMINATED SAFETY GLASS

Joseph D. Ryan and George B. Watkins, Toledo, Ohio, assignors to Libbey-Owens-Ford Glass Company, Toledo, Ohio, a corporation of Ohio Application August 7, 1940, Serial No. 351,694

2 Claims. (Cl. 154—2.75)

The present invention relates to laminated safety glass wherein the plastic interlayer is ethyl cellulose plastic which is bonded to the glass sheets by an adhesive produced from a specially selected type of ethyl cellulose.

Ethyl cellulose is a cellulose ether derivative as distinguished from cellulose acetate which is a cellulose ester. We have experimented extensively with ethyl cellulose plastic because of its inherent stability toward heat and light energies.

Broadly speaking, there have been two phases involved in the problem: (1) the making of an ethyl cellulose plastic having desirable thermoplastic characteristics; and (2) discovery and development of an adhesive capable of bonding the plastic interlayer to the glass sheets. We have found that ethyl cellulose plastic designed to have the desired thermoplastic properties as a plastic interlayer for laminated safety glass does not likewise possess the necessary adherent characteristics toward glass such as will permit direct bonding thereof to glass. This, thus, necessitates the employment of an adhesive, and the common, well known adhesives ordinarily employed for cellulosic plastic materials are not satisfactory for this purpose.

The present invention is based on the discovery of certain critical ranges which must be operated within to get the desired results to give a finished laminated safety glass possessing extremely good adhesion and, as well, good resistance to impact at both high and low temperatures.

An important feature of our invention resides in the fact that we can control the adherent properties of the ethyl cellulose material by controlling its ethoxy content and establishing a predetermined relationship between the ethoxy content of the plastic interlayer and the ethoxy content of the ethyl cellulose in the adhesive material.

The single figure of the drawing represents a vertical, transverse section through a sheet of finished laminated safety glass.

By referring to the figure of the drawing, it will be noted that the sheet of safety glass illustrated is composed of two sheets of glass 5, a plastic interlayer 6, and adhesive layers 7 disposed between the plastic and glass. In addition to the particular construction shown, other forms of laminated glass are well known where a greater number of laminations of glass and plastic are employed, and it will be understood that the present invention is applicable to these various well known forms of laminated glass.

We have determined that an ethyl cellulose plastic interlayer formed from ethyl cellulose having an ethoxy content of 47% or 48%, coupled with proper plasticization thereof, gives an extremely satisfactory plastic insofar as its thermoplastic properties are concerned as well as its stability toward heat and light energies and relative freedom from hydrolysis. If the ethoxy content is increased above 48% or decreased below 47%, the resulting products do not serve as satisfactory base materials for the manufacture of ethyl cellulose plastic, because the resulting plastics lose some of their desirable thermoplasticity characteristics and are generally unsuited for the manufacture of safety glass plastic interlayers.

Ethyl cellulose having an ethoxy content of 47% or 48% can be satisfactorily plasticized using a range of plasticizer from 25 to 100 parts by weight, and employing such plasticizers as dibutyl phthalate, dihexyl phthalate, diamyl, dimethyl, diethyl, etc., phthalates. Such plastics, however, cannot be adequately and permanently bonded to glass by merely pressing the same between the glass even when the pressing is accomplished in the presence of elevated temperatures.

We have discovered that extremely desirable adhesion can be obtained if an adhesive is produced from ethyl cellulose having an ethoxy content of from 35% to 45%. 41% represents a good average, but excellent adhesion can be obtained throughout the entire range of 35% to 45% ethoxy content. We have noted that the upper limit of 45% is perhaps more critical than the lower limit of 35% because above 45% very unsatisfactory adhesion, if any adhesion, results. On the other hand, it is possible that an ethoxy content lower than 35% could be used for adhesive purposes if it would remain compatible with the plasticizers used and also with the plastic sheeting used for making the laminated glass structures. Based on the work we have done with innumerable adhesives, we consider it preferable not to use a material having less than 35% ethoxy content but, as stated, the indications are that in some instances and with specially selected plasticizers, it might be possible to get satisfactory adhesion if the lower limit is reduced somewhat.

In producing the ethyl cellulose from which the adhesive is made, the ethylation process is carried out in such a way that etherification of the cellulose is halted or arrested in the 35%–45% range. Obviously, such ethyl cellulose per se would be useless for the plastic interlayer but it will serve for making very satisfactory adhesives.

We have found that ethyl cellulose, having an ethoxy content of from 35% to 45% obtained by direct etherification into this range, can be plasticized with such plasticizers as dimethyl diethyl, dibutyl, dihexyl, etc., phthalates, and can be dissolved in such solvents as acetone, cellosolve, esters to permit application thereof to the glass sheets.

We consider dibutyl phthalate especially desirable for use as a plasticizer in the plastic because it is available commercially in large quantities and at relatively low cost and, in addition, is very stable to light and heat. We are tabulating below break test data obtained when testing laminated safety glass made in accordance with our invention:

| Ethyl cellulose plasticized with— | Thickness of plastic | Impact temperature | | |
|---|---|---|---|---|
| | | 0° F. | 70° F. | 120° F. |
| | *Inches* | | | |
| 34 parts dibutyl phthalate | 0.020 | 16 | 25 | 28 |
| | 0.025 | 26 | 33½+ | 35 |
| 50 parts dibutyl phthalate | 0.020 | 24 | 21 | 18 |
| | 0.025 | 30 | 32 | 29 |
| 75 parts dibutyl phthalate | 0.020 | 25 | 22 | 18 |
| | 0.025 | 31 | 33 | 21 |
| 100 parts dibutyl phthalate | 0.020 | 19 | 14 | 10 |
| | 0.025 | 25 | 22 | 13 |

All of the laminations were twelve inches by twelve inches in size and were impacted with a half pound, freely falling steel ball. The figures given in the "Impact temperature" columns represent feet.

We claim:

1. Laminated safety glass comprising two sheets of glass and an interposed layer of ethyl cellulose plastic, whose ethoxy content is 47% to 48%, bonded to said glass sheets with an adhesive containing ethyl cellulose whose ethoxy content does not exceed 45%.

2. Laminated safety glass comprising two sheets of glass and an interposed layer of ethyl cellulose plastic, whose ethoxy content is 47% to 48%, bonded to said glass sheets with an adhesive containing ethyl cellulose whose ethoxy content is from 35% to 45%.

JOSEPH D. RYAN.
GEORGE B. WATKINS.